United States Patent
Christian et al.

(10) Patent No.: US 11,275,943 B2
(45) Date of Patent: Mar. 15, 2022

(54) ENABLING INTELLIGENT DISPOSAL

(71) Applicant: International Business Machines Corporation, Armonk, NY (US)

(72) Inventors: Susan Jachin Christian, Grapevine, TX (US); Pushpita Panigrahi, Dallas, TX (US); Michael Anson Lau, Arlington, TX (US); Romelia H. Flores, Keller, TX (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 16/567,272

(22) Filed: Sep. 11, 2019

(65) Prior Publication Data
US 2021/0073542 A1    Mar. 11, 2021

(51) Int. Cl.
*G06K 9/00* (2022.01)
*G06N 5/04* (2006.01)
(Continued)

(52) U.S. Cl.
CPC ....... *G06K 9/00671* (2013.01); *G06K 9/6202* (2013.01); *G06N 5/04* (2013.01); *G09B 19/003* (2013.01); *G06N 20/00* (2019.01)

(58) Field of Classification Search
None
See application file for complete search history.

(56) References Cited

U.S. PATENT DOCUMENTS

| 4,379,525 A | 4/1983 | Nowicki |
| 4,830,188 A | 5/1989 | Hannigan |

(Continued)

FOREIGN PATENT DOCUMENTS

| EP | 634260 B1 | 6/1995 |
| EP | 0696236 B1 | 10/1996 |
| EP | 1052583 A2 | 11/2000 |

OTHER PUBLICATIONS

Lönnberg-Hickling, "Recycling Web App", downloaded from the Internet on Jul. 10, 2019, 24 pps., <https://lealonnberg.com/new-recycling-web-app>.

(Continued)

*Primary Examiner* — Oneal R Mistry
*Assistant Examiner* — Nicolas James Boyajian
(74) *Attorney, Agent, or Firm* — David K. Mattheis; Maeve M. Carpenter (57) ABSTRACT

Object disposal recommendations are generated by classifying an object within an image based on object recognition and metadata of the image and comparing the object and metadata to a corpus of object classification images. A current object state is determined relative to disposal recommendation, based on disposal policies. Responsive to determining disposal of the object in the current state is not recommended, one or more components of the object are identified, and a determination made as to a recommendation for disposal of the one or more object components. If a disposal recommendation is found for the one or more components of the object, the processor generates information to disassemble and prepare the one or more components of the object for disposal and provides disposal recommendation for the one or more components of the object.

17 Claims, 4 Drawing Sheets

(51) Int. Cl.
*G09B 19/00* (2006.01)
*G06K 9/62* (2022.01)
*G06N 20/00* (2019.01)

(56) References Cited

U.S. PATENT DOCUMENTS

| | | | |
|---|---|---|---|
| 5,111,927 | A | 5/1992 | Schulze, Jr. |
| 5,314,072 | A | 5/1994 | Frankel |
| 6,138,558 | A | 10/2000 | Harrington |
| 8,171,610 | B2 | 5/2012 | Kashikura |
| 8,261,916 | B2 | 9/2012 | Enomoto |
| 9,691,161 | B1 | 6/2017 | Yalniz |
| 2007/0219862 | A1 | 9/2007 | Casella |
| 2009/0079128 | A1 | 3/2009 | Enomoto |
| 2012/0265589 | A1 | 10/2012 | Whittier |
| 2014/0379588 | A1* | 12/2014 | Gates ............... G06Q 10/30 705/308 |
| 2015/0271208 | A1 | 9/2015 | Gallant |
| 2015/0302364 | A1* | 10/2015 | Calzada ............ G06Q 10/1095 705/7.19 |
| 2017/0011580 | A1 | 1/2017 | Huang |
| 2019/0066062 | A1 | 2/2019 | Lilly |
| 2020/0175883 | A1* | 6/2020 | Stelmar Netto ... G01N 29/4445 |
| 2020/0222949 | A1* | 7/2020 | Murad ................... B07C 7/005 |
| 2020/0372498 | A1* | 11/2020 | Chen ................... H04L 9/3239 |
| 2021/0035146 | A1* | 2/2021 | Odom ............... G06Q 30/0226 |

OTHER PUBLICATIONS

Li et al., "Recycle with Watson", Artificial intelligence, IBM Developer, Oct. 20, 2017, 4 pps., <https://developer.ibm.com/patterns/recycle-with-watson/?cm_mmc-dw-_-IBMCode-_-dWENews2018-_-email&spMailingID=33882032&spUserID=NDU0MDI0MTI0NDcwS0&spJobID=1261611464&spReportId=MTI2MTYxMTQ2NAS2>.
Kim, "Fun With Trash", Seoul National University/Imagga, 9 pps., Copyright © 2019 Imagga Technologies Ltd., <https://imagga.com/success-stories/seoul-national-university-case-study.html>.
"Recycling simplified", Recycle Coach, 5 pps., ©2011-2019 All Rights Reserved., https://solutions.recyclecoach.com/>.
Nini, "8 Free Mobile Apps to Help You Recycle", Jul. 15, 2018, eco Warrior Princess, 8 pps., <https://ecowarriorprincess.net/2018/07/7-free-mobile-apps-to-help-you-recycle/>.

* cited by examiner

ENABLING INTELLIGENT DISPOSAL

FIELD OF THE INVENTION

The present invention relates generally to the field of management of waste disposal, and more particularly to enabling intelligent services to facilitate proper object disposal.

BACKGROUND OF THE INVENTION

Most citizens understand the importance of proper disposal of household items and have a general idea of pickup services or disposal events available for their location. However, often the details of policies, schedules, and separation of items for disposal are not fully known and may be difficult or inconvenient to find. Villages, towns, cities, and counties that offer disposal services, such as garbage, recycling, yard waste, chemical, pharmaceutical, electronic, and appliance disposal, often establish detailed policies governing which items are designated for a particular service, limits, schedules, and other conditions associated with each service, as well as whether pickup is provided or drop off is required by the service.

Citizens that may relocate often may not be fully aware of the disposal services available and applicable conditions and may lack the knowledge and/or patience to be well informed. Even if citizens become familiar with their particular location's policies, it is unlikely that they will revisit information sites in order to remain current with policy and condition changes to disposal services.

In order to enable citizens to properly dispose of items some locations provide "special" disposal bins, especially for recycling. Citizens place their recyclable goods into the bins for appropriate "pick-up" by the location's waste management service. In some cases a citizen is provided with a single recycle bin for all recyclables; however, it has become more common for locations to provide a single bin with multiple compartments or multiple bins to encourage citizens to sort through the plastic, paper, bottles and other items and "categorize" the items into the appropriate bin or bin compartment. In addition to understanding recycling policies and separating disposal items per location policies and guidelines, a citizen will also need to understand scheduling of disposal "pick-up". Scheduling for disposal category "pick-up" or "drop-off" collections needs to be understood by the citizen, along with the policies and guidelines for each disposal category.

SUMMARY

Embodiments of the present invention disclose a method, computer program product, and system. The method provides for generating a computer-implemented recommendation for disposal of an object in which one or more processors classifies an object included in a received image. The one or more processors determine whether a current state and the classification of the object includes a recommendation for disposal, based on disposal policies of a community location associated with disposal of the object. Responsive to determining disposal of the object in the current state is not recommended, based on the disposal policies of the community location, the one or more processors identify one or more components of the object. The one or more processors determine whether a recommendation for disposal of the one or more components of the object is available, based on a type of the object and material of the one or more components. Responsive to determining a recommendation for disposal of the one or more components of the object is available, the one or more processors generate a notification including instructions for disassembly of the object and preparation of the one or more components of the object for disposal, and the one or more processors provide the recommendation for disposal of the one or more components of the object, and the preparation for completing the disposal action.

DETAILED DESCRIPTION

Embodiments of the present invention recognize that citizens of a particular community location may not be knowledgeable of all disposal services available nor informed of policies corresponding to the disposal services. Embodiments further recognize that obtaining the information associated with disposal services and corresponding policies is time consuming, inconvenient, and not always available in accessible and clearly understandable sources. Often, community location policies for disposal are updated or changed without adequate notification.

Acknowledgement of existing problems with object disposal includes: a lack of information a citizen has on a location's disposal policies and "pick-up" schedules in a real-time fashion; a lack of knowledge on how to prepare items for appropriate disposal based on location policies; an identification of object components and understanding of how to effectively disassemble an item for proper disposal; a lack of information on handling disposal associated with holidays and citizen special events resulting in increased disposal; the lack of information regarding citizens' disposal performance per time period; and a motivation for citizens to dispose of objects as recommended.

Embodiments of the present invention improve the effectiveness and efficiency of object disposal by providing an intelligent citizen disposal system (ICDS) with capabilities and features that facilitate disposal decisions, preparations, schedule reminders, and incentives. In some embodiments the ICDS includes disposal of objects, sometimes referred to as disposal items, which can be classified into combinations of garbage, recycling, electronics, pharmaceuticals, chemicals, and appliances. In some embodiments a certain location community establishes policies and schedules for each disposal classification. In some embodiments, the citizen operates an ICDS application (app), on a computing device (typically a mobile device) and captures an image of the object for disposal. The ICDS app applies object recognition services through application program interfaces (APIs) and identifies the captured object image against a corpus of objects and material types.

Subsequent to object identification, the ICDS app determines the disposal recommendation of the object as depicted in the captured image. In some embodiments, disposal recommendations are dependent on disposal policies of a particular community location, which is accessible by the ICDS app. In some embodiments, the object may be in a condition or state to receive a disposal recommendation. In other embodiments, the object may have components which have differing recommendations for disposal. For example, packaging of a purchased item may include a plastic enclosure that can be recycled, and protective packaging foam that is disposed of in garbage. In some embodiments, the ICDS app provides disassembly information to the citizen to separate and optimally dispose of the components of the object, and further includes instructions as to the proper disposal container or section of a container provided by the location's disposal authority.

In some embodiments of the present invention tracking information of disposal service pick-up vehicles is included, enabling determination of the vehicle's location relative to a citizen's residence, and may further include tracking information of provided disposal containers enabling determination of whether a container is placed in a proper position for pick-up. In some embodiments, the ICDS app provides data regarding disposal participation of citizens and can be used to implement incentive and competitive programs.

When disposing of items, a citizen accesses the system via the ICDS app to gain insight and instruction on actions to take regarding the to-be-disposed-of object, based on the location's disposal policies, so the object can be disassembled into basic disposable components. The citizen is provided best practices for disposal of items as well as information regarding how to best sort items for disposal through information received via the ICDS app. In some embodiments, the ICDS system can provide recommendations on placing disposable objects or their components into colored bins, or if lighting sensors are attached to the recycle bins, the sensors could be activated by proximity of the app on the mobile device and turned "on" briefly to ensure the citizen can clearly identify into which bin or bin compartment the disposal object is to be placed.

In another embodiment, the disposal bins have a "placement" sensor, or the ICDS app may have a feature activated by a citizen to inform the location disposal operations that the disposal bins have been placed in the appropriate pick-up position. By leveraging the ICDS a citizen is enabled to plan for and obtain additional disposal bins in preparation for special events and/or holidays. For example, if a citizen plans on an event with friends and relatives visiting their household at Holiday times, the citizen may request additional disposal bins or containers anticipating additional plastic and paper recycling for a specific time period.

In some embodiments of the present invention, alerting capabilities are available via the ICDS app, and are configured by a citizen utilizing the ICDS system. In some embodiments, the alerts provide the citizen with a reminder of the community location's schedule for regular service "pick-ups" or particular drop-off events. In other embodiments, alerts are generated based on location proximity of pick-up vehicles to a citizen's residence, providing the citizen a check to ensure the appropriate placement of disposal bins has already occurred or a last-minute opportunity to take action in a timely fashion. In yet other embodiments, the ICDS provides a "history" of a citizen's disposal activities and participation for a chosen timeframe (week, month, year) which may be applied to an incentive program, rewarding citizens for compliance and contribution to the community location's disposal policies and programs.

Often, a community location relies on citizens to remember disposal "pick-up" days based on set schedules for the various neighborhood areas. It is common for a citizen to place disposal items on a sidewalk or curb adjacent to their home to facilitate disposal vehicles with assigned crews to access the disposal items that may be contained in bins or containers. Based on an assumption of citizens having active, busy lifestyles in general, forgetting or losing track of disposal schedules for disposal bin "pick-up" may occur frequently. Searching for access to disposal policies and schedules is inconvenient, time consuming. Often, the policies and procedures are not easily accessible to citizens, and policies regarding optimal recycling, such as disassembling and separating items based on material, are not common knowledge. Holiday and weather events may disrupt schedules, and policy and procedure updates, changes, and "pick-up" schedules may go unnoticed or unrecognized.

Citizens would be more inclined to take additional action, and recycling seriously, if they are provided with improved tools and "information at their fingertips" to recycle efficiently and to be reminded of "pick-up" or "drop-off" schedules to consistently participate and comply. Moreover, citizens could be incented to recycle in greater amounts if they understood the impact of their recycling activities on a time-based and aggregate basis.

Figure 1:
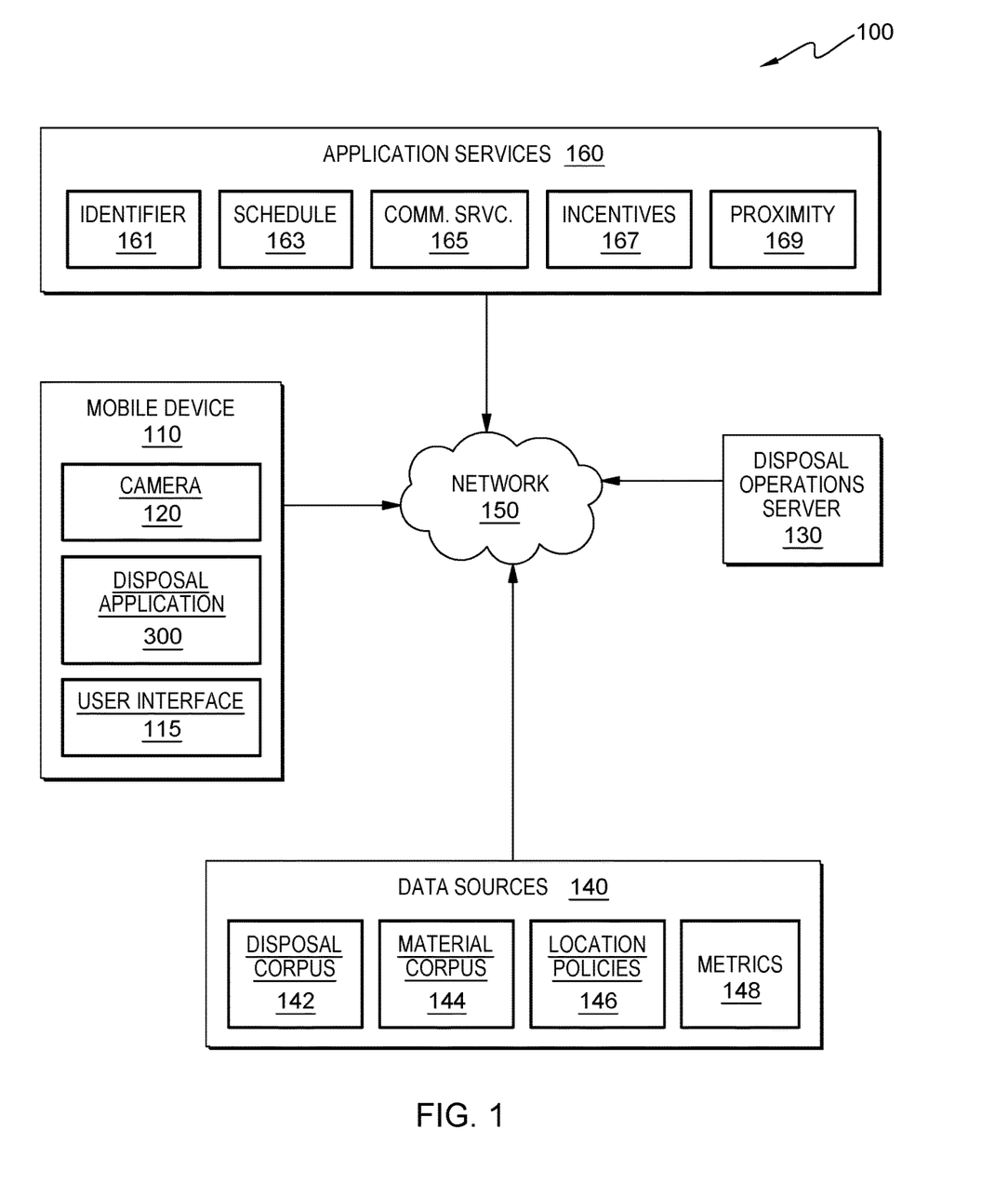
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes mobile device 110, data sources 140, application services 160, disposal operations server 130, all connected via network 150.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between mobile device 110, application services 160, disposal operations server 130 and data sources 140, in accordance with embodiments of the present invention.

Mobile device 110 is a computing device that includes user interface 115, disposal application 300 (referred to previously as the ICDS app), and camera 120. Mobile device 110 can be a standalone computing device, a smart phone, a tablet computer, a laptop computer, or any other electronic device or computing system capable of receiving, sending, and processing data. In other embodiments, mobile device 110 can represent a computing device interacting with applications and services hosted and operating in a cloud computing environment. In another embodiment, mobile device 110 can be a netbook computer, a desktop computer, a personal digital assistant (PDA), or other programmable electronic device capable of communicating with disposal operations server 130, data sources 140, and application services 160, and other computing devices (not shown) within distributed data processing environment 100 via network 150. In another embodiment, mobile device 110 represents a computing system utilizing clustered computers and components (e.g., database server computers, application server computers, etc.) that act as a single pool of seamless resources when accessed within distributed data processing environment 100. Mobile device 110 may include internal and external hardware components, as depicted and described in FIG. 4.

User interface 115 provides users of mobile device 110 an interface to operate camera 120 and disposal application 300. In some embodiments of the present invention, user interface 115 provides alert and notification communications regarding disposal schedules, proximity of "pick-up" vehicles, and incentive award status. In some embodiments, user interface 115 provides a citizen (e.g., user of mobile device 110) operational access to camera 120 and enables generation of images of objects to be disposed. In one embodiment, user interface 115 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also be mobile application software that provides an interface to features and functions of mobile device 110. User interface 115 enables a user of mobile device 110 to receive, view/hear, and respond to input, access applications, and perform function available on mobile device 110.

Camera 120 is a component of mobile device 110 and includes image taking capability that is utilized by object recognition services. In some embodiments of the present invention, camera 120 is used to generate images of disposal objects which are received by disposal application 300 and compared to disposal corpus 142 and material corpus 144 via service application programming interfaces (APIs) for identification of disposal objects, components of objects, and material consideration for proper disassembly and disposal recommendations.

Figure 3:
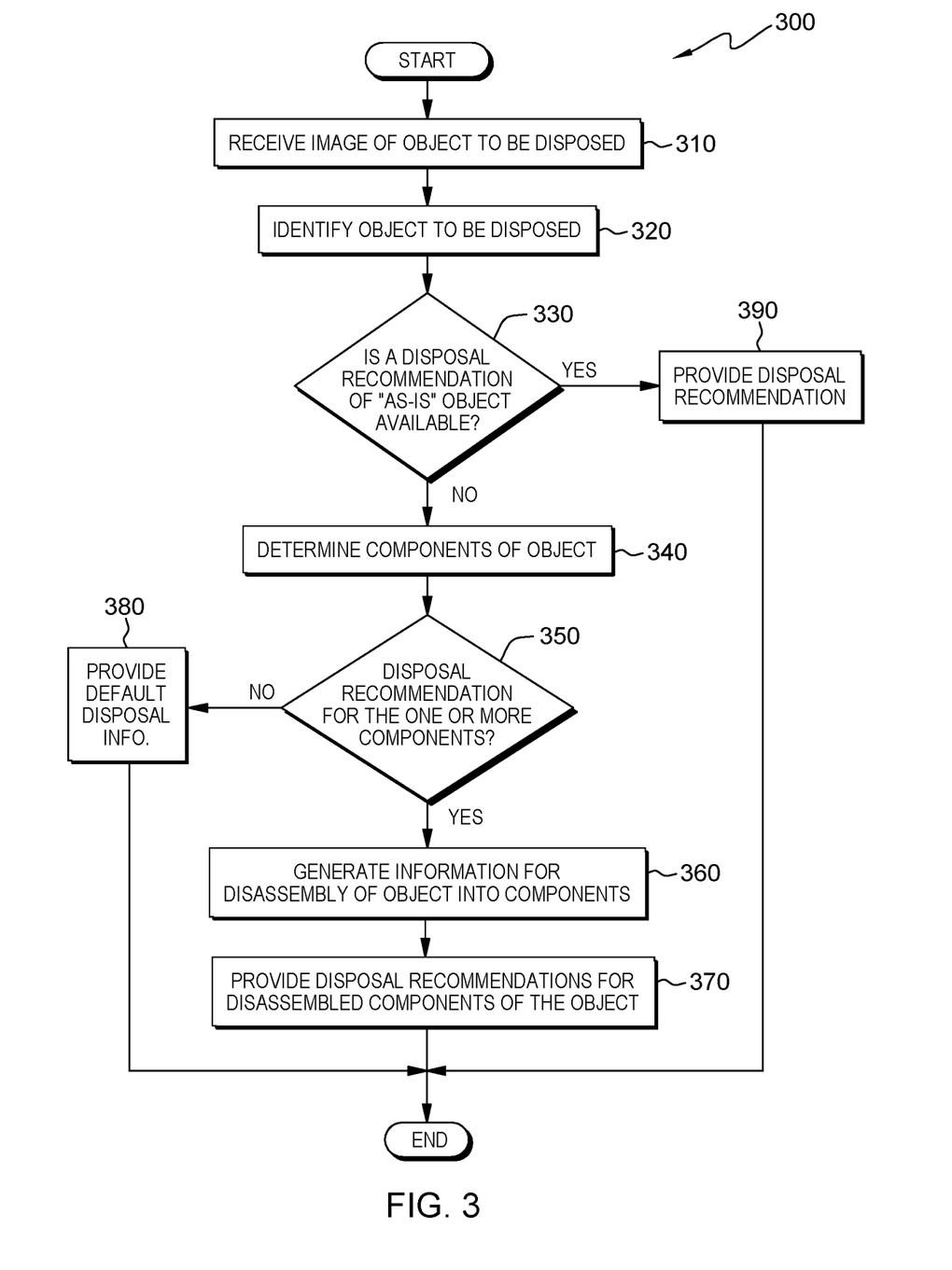
FIG. 3 is a flowchart illustrating the operational steps of a disposal application operating within the distributed data processing environment of FIG. 1, in accordance with an embodiment of the present invention.

Disposal application 300 operates on mobile device 110, includes access and control of camera 120, and is accessed via user interface 115. Disposal application 300 accesses components of data sources 140 and application services 160 via network 150. Disposal application 300 includes features to: capture one or more images of an object intended for disposal; identify the object, classify the object and, as appropriate, components of the object; determine and provide disassembly and preparation instructions for disposal of the object; confirm the preparation and proper disposal of the object/components; and determine and track incentive and recognition rewards for participation and compliance of object disposal. In some embodiments, disposal application 300 identifies objects and object components by analysis of captured images and comparison with images and metadata of disposal corpus 142 data, and materials corpus 144. Disposal application 300 retrieves disposal recommendations, schedules, and compliance attributes from location policies 146 data source, and schedule 163 service.

Disposal application 300 tracks and stores citizen participation and compliance data metrics 148 and uses the data to determine disposal history, and citizen status towards incentive rewards as determined and monitored by data of incentives 167. Disposal application 300 includes features and functions enabling search of location policies and schedules for disposal pick-up and collection events; monitoring participation and compliance of citizens of the community location; accessing and displaying information regarding incentive and reward programs and current status of a participating citizen; providing alerts and notification reminders associated with disposal pick-up, or scheduled collection events.

Disposal operations server 130 is a computing device with a user interface (not shown) similar to user interface 115 and provides access for appropriate location disposal authorities to update location policies 146 and receive metric information regarding citizen disposal activity from metrics 148. Disposal operations server 130 enables access and updates to application services 160, including schedule 163, communication service 165, and incentives 167.

Disposal operations server 130 can be a server computer, a blade computer, a laptop computer, a tablet computer, a netbook computer, or any other programmable electronic computing device capable of receiving, sending, and processing data, and communicating via network 150 with mobile device 110, data sources 140, application services 160, and other computing devices (not shown) within distributed data processing environment 100 via network 150. In other embodiments, disposal operations server 130 can represent a virtual computing device operating based on multiple computers as a server system, such as in a cloud computing environment. In another embodiment, disposal operations server 130 represents a computing system utilizing clustered computers and components (e.g., database server computers, application server computers, etc.) that act as a single pool of seamless resources when accessed within distributed data processing environment 100. Disposal operations server 130 may include internal and external hardware components, as depicted and described in FIG. 4.

Data sources 140 is depicted as a collection of data supporting functions and capabilities of disposal application 300. Data sources 140 includes disposal corpus 142, material corpus 144, location policies 146 and metrics 148. In some embodiments, the stored data of components of data sources 140 may be hosted within a single computing storage system. In other embodiments, the data components of data storage 140 may be stored in a cloud storage environment and may be distributed across multiple storage devices.

Disposal corpus 142 is a collection of data associated with a plurality of objects that are disposed. In some embodiments of the present invention, disposal corpus 142 includes image data and metadata used in object recognition, as well as data associated with disassembly of object components to facilitate separation of object components having different disposal recommendations. For example, disposal corpus 142 may include image data and metadata associated with aluminum beverage cans, glass bottles, plastic bottles and containers, plastic wrapping and product packaging combining plastic and paper or cardboard. Disposal corpus 142 includes data applied to and compared with object images from camera 120 of mobile device 110, captured by disposal application 300 and used to identify the object and components of the object, enabling provision of proper disposal recommendations. For objects including combinations of components, disposal corpus 142 may include disassembly information to separate components having disposal recommendations that differ.

Material corpus 144 is a collection of data associated with recognition of various materials, based at least in part on imagery of the object. In some embodiments of the present invention, material corpus 144 includes imagery data to recognize glass, plastic, and metal objects. In some embodiments, material corpus 144 includes imagery data to identify liquified chemicals and pharmaceutical solids as well. In some embodiments the image data and associated materials data of material corpus 144 enables a likely identification of disposal object material and includes considerations (along with location policies 146) in providing disposal recommendations for the object and/or components. In some embodiments, material corpus 144 includes imagery used in recognition of appliances and electronic devices and components that, along with location policies 146, may require alternative disposal activity. Disposal application 300 includes access to services that apply material corpus 144 (and disposal corpus 142, along with location policies 146) in identifying a disposal object and components, and in determining an appropriate disposal recommendation for the disposal object.

Location policies 146 include data and information associated with the community location's disposal service offerings, guidance of appropriate disposal separations, limitations of size, weight, frequency and, scheduling of pick-up, drop off or collection events. In some embodiments of the present invention, location policies 146 provides disposal recommendations for an object or components of an object, based on one or more images of the object and analysis and comparison to image and material data of disposal corpus 142 and material corpus 144. The disposal recommendations from location policies 146 are communicated to a user of mobile device 110 operating disposal application 300 by use of user interface 115 through communication services 165 via network 150. In some embodiments, location policies 146 includes information regarding incentives and rewards associated with participation and compliance of disposal recommendations. Location policies 146 may be updated by input and editing performed through authorized users of disposal operations server 130.

Metrics 148 is a collection of data associated with citizens' participation and compliance with disposal recommendations as defined in location policies 146. In some embodiments, metrics 148 includes records of participation by citizens, based on indication of disposal bins and containers positioned appropriately for pick-up, or recorded at drop off sites and collection events scheduled by the disposal authorities of the community location. In some embodiments, metrics 148 may receive information from disposal application 300 that disposal bins are deployed to appropriate locations for pick-up. In other embodiments, the disposal bins may include sensors that register their deployment for pick-up as received by the pick-up vehicles performing the disposal service. Metrics 148 stores the disposal data of citizens, neighborhoods, and the entire community location. The disposal data can be used in various sustainability reports and as feedback to improve or create new disposal initiatives and services.

Metrics 148 may be accessed by disposal operations server 130 to enable disposal authorities to offer incentives to citizens achieving certain levels of participation and compliance. In some embodiments, the incentives may offer achieving citizens discounts for various location-related items, such as parking or admission to a city event, or tax incentives. In other embodiments, the incentives may take the form of friendly competition between portions of the community location.

Application services 160 is a collection of services associated with disposal of objects within the community location and provided via disposal application 300. Application services 160 includes identifier 161, schedule 163, communication service 165, incentives 167, and proximity 169. In some embodiments, application services 160 are included on mobile device 110 and operated by disposal application 300. In other embodiments, application services are remote from mobile device 110, as depicted in FIG. 1, and are accessed by disposal application 300 through network 150 and via APIs of individual services offered in support of object disposal of a community location disposal services.

Identifier 161 is a service accessed and operated by disposal application 300 in which one or more images of an object to be disposed of from camera 120 of mobile device 110 are compared to data and imagery of disposal corpus 142 and material corpus 144. Identifier 161, operated by disposal application 300 analyzes and compares images of the object to be disposed and compares the image to the data of disposal corpus 142 and material corpus 144 to identify the object, determine the material construction of the object, and determine whether the object includes components that may receive differing recommendations of disposal. Identifier 161 identifies the object and provides a response message to disposal application 300 on mobile device 110 confirming the identification of the object and may include information regarding the state of the object relative to disposal. For example, the state of the object may be that the object requires some preparation, such as minor cleaning, prior to including in a disposal bin. Alternatively, the object may require disassembly so that components of the object may be properly disposed due to differing disposal recommendations for each component of the object.

Schedule 163 is a service that includes information regarding the scheduling of pick-up and collection point drop-off for disposal of objects/items. Schedule 163 may include day of the week, day of the month, or specific dates and times for disposal services provided by a community location. Schedule 163 may include a timeframe or range of time for pick-up or collection drop off of disposal items. For example, garbage and recycling services may be provided as "pick-up" at a citizen's residence within the community location and may indicate a day of the week and time range within the day for the pick-up service. In some embodiments, yard waste may be scheduled for a day of the week, differing from garbage and recycling pick-up, or may be scheduled for one or more particular days or dates within a month. In some embodiments, schedule 163 includes dates and times for disposal service of electronic components, chemicals, pharmaceuticals, appliances, or confidential destroy of paper documents. Schedule 163 provides scheduling information for a citizen operating disposal application 300 on mobile device 110 and presents information to the citizen. In some embodiments, schedule 163 presents information in response to receiving disposal schedule requests. In other embodiments, schedule 163 may initiate reminder notifications directed to the citizen prior to scheduled pick-up or collection drop-off dates/times.

Communication service 165 is a service that works in combination with application services 160, data sources 140, disposal operations server 130, and mobile device 110. Communication service 165 receives and monitors tracking of disposal vehicle crews and enables and transmits alerts and notifications to citizens providing reminder notifications and "last-minute" alerts when pick-up vehicles are within a proximity distance of a pick-up area or address. Communication service 165 enables the disposal operations authority for the community location to communicate with citizens of the community location, via disposal operations server 130, regarding special occasions, changes to policies, and incentive information. Communication service 165 also facilitates feedback to the disposal operations authority.

Incentives 167 is a service coupled with metrics 148 to determine citizen participation and compliance associated with disposal policies and schedules, based on a history of disposal pick-up, disposal bin location, request for disposal recommendations and images confirming disassembly and preparation for proper disposal. Incentives 167 compares object disposal participation and performance of citizens against a pre-determined standard threshold and determines whether the citizen (or groups of citizens) have met or exceeded the standard threshold. In some embodiments, incentives 167 provides information regarding earned rewards associated with disposal incentives, based on data collected and stored in metrics 148. In some embodiments, incentives 167 informs citizens of earned rewards as appropriated by the community location disposal authority. In some embodiments, incentives 167 includes a competition of participation and compliance between groups of citizens, such as defined neighborhoods. These metrics correlate to the recycling efforts of the citizen. Metrics stored in this database can be used through a disposal operations user interface (not shown) on disposal operations server 130, to distribute incentives or awards to citizens. For example, the statistics of how many bottles, cans, and plastic waste a citizen recycles in a year can correlate to free parking at one or more location events.

Proximity 169 is a service that includes tracking and sensor-received data regarding the position of pick-up service vehicles, and in some embodiments, detection of sensors associated with disposal bins positioned for pick-up by citizens. In some embodiments, the position of a disposal pick-up vehicle and associated crew triggers an alert to citizens within a pre-determined proximity of the vehicle, providing a "last-minute" alert for citizens to place disposal bins in an appropriate location for pick-up, as designated by location policies 146. In some embodiments, proximity 169 provides a notification to a citizen via disposal application 300, if disposal bins are detected in a position other than the designated positions/areas for pick-up, for a given disposal pick-up scheduled day and time range. In some embodiments, bins may include sensors that work in combination with disposal application 300 and mobile device 110 to enable detection of GPS location data of a disposal bin, which is compared to a previously defined GPS location deemed appropriate for a particular disposal pick-up, such as by a street curb for a respective citizen's home location.

Figure 2:
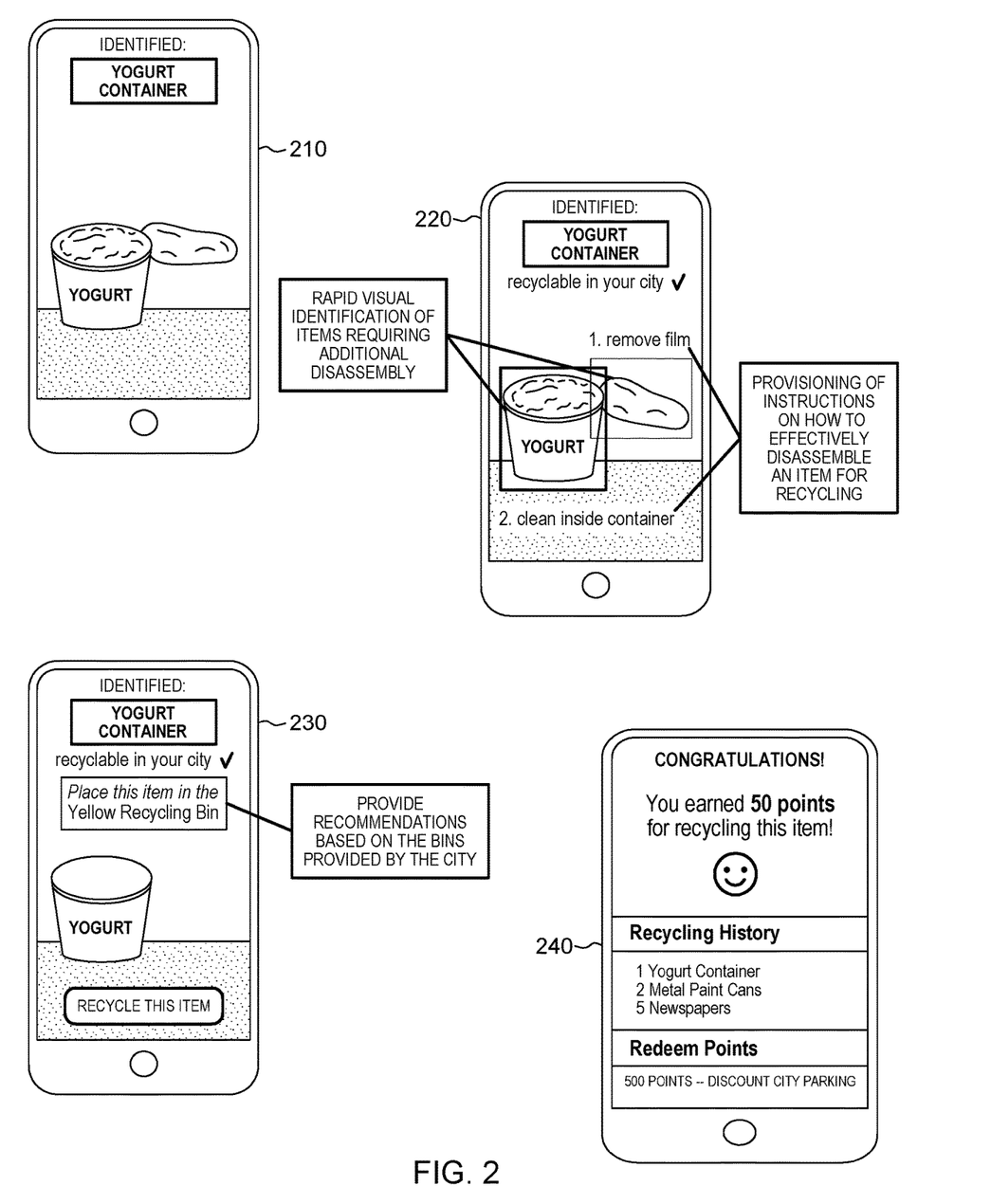
FIG. 2 is a sequence of images illustrating use of a disposal application operating on a mobile device, in accordance with an embodiment of the present invention.

FIG. 2 illustrates a sequence illustrating use of disposal application 300 operating on mobile device 110. The sequence includes identifying an object for disposal, determining the state of the object for disposal, preparation for disposal and confirming the disposal recommendations, in accordance with embodiments of the present invention. FIG. 2 includes object capture and identify 210, disassemble and prepare 220, disposal information 230, and confirmation and incentives 240.

Object capture and identify 210 illustrates capturing an image of an object to dispose of by use of a camera of a smart phone, such as directing camera 120 of mobile device 110 towards a yogurt container with a top removed but remaining attached. The image of the object is classified from the image, facilitating identification. The classification and identification of the object included in the image is based, at least in part, on: (i) object recognition of the object within the image, (ii) metadata that is associated with the object, and (iii) comparing the image and metadata of the object to a corpus of object classification images.

A user of mobile device 110 initiates disposal application 300 and selects the feature to identify an object for disposal recommendations. Camera 120 is activated to capture one or more images of the object, depicted as an open yogurt container with residue remaining in the container. Disposal application 300 compares the captured image(s) and performs an analysis and comparison with images within disposal corpus 142 to identify the object. In some embodiments, material corpus 144 is accessed by disposal application 300 for material determinations. Object image capture 210 indicates a received response identifying the object as a yogurt container.

Disassemble and prepare 220 illustrates a response by disposal application 300 on the display of mobile device 110. The response includes identifying components of the object and indicating that disassembly of the components is required for proper disposal. Disassemble and prepare 220 includes directions for disassembly, "1. remove film", and additionally provides information to prepare the component of the object for proper disposal, "2. clean inside container." Disassemble and prepare 220 also illustrates a message of disposal recommendation that the object is "recyclable in your location."

Disposal information 230 illustrates additional disposal information provided to the citizen operating disposal application 300 on mobile device 110. Disposal information 230 illustrates the component of the yogurt container with a "cleaned inside," as instructed in preparation information provided. In response to determining the disassembly and preparation of the object component is complete, disposal information 230 illustrates a recommendation of the proper recycling bin, yellow, as provided by the disposal authority of the local location.

Confirmation and incentives 240 illustrate an embodiment of the present invention in which disposal application 300 includes confirmation of adding a recyclable item to the proper disposal bin, presenting the citizen with disposal history information, and presenting a status of reward points towards an incentive of discount parking within the location. In some embodiments, the confirmation of disposal may be determined by user confirmation, whereas in other embodiments photo images may confirm completion disposal activities. In some embodiments, the disposal history may track a number of items or change in weight or volume within a disposal bin.

FIG. 3 is a flowchart illustrating the operational steps of disposal application 300, in accordance with an embodiment of the present invention. In some embodiments of the present invention, disposal application 300 operates on a mobile computing device that includes an image capturing function, such as a camera. In some embodiments, disposal application 300 includes options selectable by a user-citizen enabling the disposal information and recommendations, location-specific disposal policies, disposal schedules of pick-up, collections or special events, and information and status of incentive programs and rewards.

In some embodiments, disposal application 300 initiates in response to identifying a selection to identify and recommend disposal of an object. Disposal application 300 initiates an image capturing function of a hosting mobile device and receives an image of an object to be disposed (step 310). The image capturing function provides one or more images of an object to be disposed of. For example, a citizen-user of mobile device 110 selects an option to determine the disposal recommendations of a partially consumed yogurt container, initiates disposal application 300, and points the camera lens of mobile device 110 to place the image of the yogurt container in the display of mobile device 110. Disposal application 300 captures one or more images of the yogurt container.

Disposal application 300 identifies the object to be disposed (step 320). The captured image is processed by object recognition services and disposal application 300 accesses disposal corpus 142 and materials 144 of data sources 140 and compares the object recognition data to the image data and metadata of disposal corpus 142. In some embodiments, disposal application 300 accesses materials 144 to assist in determining the identification of the object and materials associated with the object. In some embodiments, the material may be liquid-based, implying consideration of chemical disposal. In other embodiments, the object may be known to include heavy metals, such as those in electronic components or batteries. In yet other embodiments, the object may be of a shape and size associated with pharmaceutical medications and require specific collection or drop off for disposal. In yet other embodiments, the object may be constructed of plant material and require recommendations for disposal of yard waste.

Having identified the object for disposal, disposal application 300 determines whether a disposal recommendation of the object in its current state ("as-is") is available (decision step 330). Disposal application 300 has access to location policies 146 and determines whether disposal recommendations are available for the identified object in its current state or whether additional action is required prior to disposal. For the case in which the object "as-is" has a disposal recommendation (step 330, "YES" branch), disposal application 300 proceeds to step 390 and provides disposal recommendations for the identified object. Disposal application 300 presents the disposal information to the user-citizen on mobile device 110 via user interface 115. For example, disposal application 300 identifies the object as a magazine and determines that no additional activity is required for disposal and proceeds to provide the disposal recommendation of recycling and indicates a particular color of bin appropriate for recycling of paper and cardboard materials. In some embodiments of the present invention, disposal application 300 prompts for the citizen-user to confirm completion of the recommendations for disposal of the object, and subsequent to receiving confirmation, disposal application 300 ends.

For the case in which the identified object "as-is" has no current-state disposal recommendation (step 330, "NO" branch), disposal application 300 determines components of the object (step 340). Disposal application 300 accesses disposal corpus 142 and determines the components of the identified object. In some embodiments, the object may include components of differing materials, such as paper and plastic, metal and plastic, or cardboard and packaging foam material. By determining the components of the object, disposal application 300 determines whether disposal recommendations, as defined in location policies 146, are available for one or more of the components. Additionally, disposal application 300 determines whether the condition of the one or more components requires additional actions prior to submitting for disposal. For example, a metallic can that contained tomato paste may require action to rinse or clean out remaining paste before disposal.

Having determined components of the object, disposal application 300 determines whether disposal recommendations are available for the one or more components (decision step 350). Each component may have differing disposal recommendations, based on disposal policies included in location policies 146. For example, plastic wrapping of a purchased clothing item may have recommendations to recycle with plastic wraps, whereas plastic wrapping for meat products purchased in a grocery store may have recommendations for disposal in garbage. For the case in which disposal application 300 determines specific disposal recommendations are not available (step 350, "NO" branch), disposal application 300 provides default disposal information for the object (step 380). Default disposal information may indicate disposal of the object in a general disposal collection, such as general waste pick-up. Subsequent to providing default disposal information, disposal application 300 ends.

For the case in which disposal application 300 determines disposal recommendations are available for one or more of the components of the object (step 350, "YES" branch), disposal application 300 generates information for disassembly of the object into its components (step 360). Disposal application 300, accessing disposal corpus 142 and location policies 146, obtains and presents information for the disassembly of the object into its components to user interface 115 of mobile device 110. In some embodiments, disposal application 300 generates instructions for disassembly of the object and instructions for the preparation of the "as-is" state of the one or more components of the object placing the object in proper condition for disposal action. In other embodiments, disposal application 300 generates a notification that includes the instructions for the disassembly and preparation of the one or more components of the object, for proper disposal action.

A citizen-user of mobile device 110 follows the disassembly information for the object. In some embodiments of the present invention, additional actions, such as cleaning or rinsing may be included in instructions, to properly prepare the object component for disposal. In some embodiments, the disassembly information disconnects one material type from another in which the disposal recommendations differ, enabling disposal and recovery of recyclable items, and special disposal actions for objects and materials that may pose more long-term issues, such as chemicals, medical pharmaceuticals, and heavy metals.

Disposal application 300 provides disposal recommendations for disassembled components of the object (step 370). Disposal application 300 accesses location policies 146 and, based on the identification of the object components, provides a disposal recommendation for respective components of the identified object. In some embodiments, the disposal recommendation includes accessing materials corpus 144 and determining the particular material of the component. The disposal recommendation is presented on user interface 115 of mobile device 110 and may include designation of a disposal bin into which the object component is placed. In some embodiments, disposal application 300 receives input confirming the disposal of the object component per the disposal recommendations and records the activity in metrics 148. For example, having identified a yogurt container as an object for disposal and determining that disassembly and preparation are required for proper disposal, disposal application 300 provides disposal recommendations to remove the top from the container base, clean the inside of the container, and submit the container base to a designated recycle bin designated for recycling of plastics.

In some embodiments of the present invention, disposal application 300 prompts for the citizen-user to confirm completion of the recommendations for disposal of the object. Having provided disposal recommendations, and in some embodiments, having received confirmed the completion of the disposal recommendation, disposal application 300 ends.

Additional practical improvements and benefits of embodiments of the present invention from the perspective of a participating citizen, as well as the perspective of benefits to a community location are presented.

From a citizen point of view, embodiments of the present invention improve the efficiency of disposal of objects subsequent to awareness of the capabilities of the Intelligent Citizen Disposal System (ICDS). A citizen can access the ICDS to gain insight and instruction, based on the community location's disposal policies, on actions to take to prepare or render the "to-be-disposed-of" object so it can be separated into basic recyclable components. The citizen is provided best practices for disposing of items as well as information regarding how to best sort their recyclable items. Depending on the embodiment of the ICDS, the system can provide recommendations on placing recyclable items into colored bins, or if lighting sensors are attached to the recycle bins, these sensors could be turned "on" for a brief time to indicate the appropriate bin or bin compartment into which the disposable item is to be placed.

In another embodiment, the disposal bins (or the ICDS application) could also have a "placement" sensor that can be set by a citizen to inform the location disposal operations that the disposal bin is positioned at an appropriate "pick-up" location near the citizen's residence. By leveraging ICDS a citizen can also plan for and obtain additional disposal bins in preparation for special events and/or holidays. For example, if a citizen will have additional visitors at their household during a Holiday, additional plastic and paper recycle bins could be requested to handle additional disposal items for the defined time period.

In some embodiments, alerting capabilities can be configured by a citizen utilizing the ICDS. The alerts can be used to communicate and provide the citizen with a reminder the day before a scheduled disposal "pick-up". In other embodiments, alerting is triggered by a disposal "pick-up" service vehicle entering a pre-determined proximity of the citizen's residence (in some embodiments, detected by global positioning system (GPS) function of the mobile device operating disposal application 300). For example, disposal vehicles reach a proximity distance that roughly is equivalent to being 15 minutes away from the citizen's residence. The alert enables a "last-minute" notification to the citizen to take action and appropriately place the disposal bin for "pick-up" service. By use of the ICDS, a citizen can be provided a history of their disposal activities for a given timeframe, and in some embodiments, be afforded incentive points as a reward for participation, compliance, and contributions to the location's disposal policies and programs.

From a community location point of view, the ICDS can help the location keep the citizen informed of policy changes as well as disposal "pick-up" times. The location could configure the ICDS with bin policy information and insights such as "blue" bins are used for paper recycling, "yellow" bins are used for plastic recycling, etc. The location can also configure the system to share the locations of disposal vehicles and provide alerts when the vehicles are within a pre-determined proximity of a citizen's residence. Through the use of a "placement" sensor attached to a disposal bin (or included in disposal application 300), the community location can anticipate the number of citizen's ready for disposal "pick-up" and react to a high number of bins awaiting "pick-up". In order to reward citizens that consistently participate and comply with location disposal policies and procedures, the location disposal authority could leverage the ICDS to track the amount of disposal content, such as the amount or frequency of recycling, is performed by respective citizens and ensure "points" or special "offers" such as free parking, free admission to a location-sponsored activity, or discounted services, are granted to participating citizens.

In some embodiments of the present invention, the ICDS manifests itself as an application (i.e. app) on their mobile device. The citizen leverages the ICDS to identify an object or item they wish to dispose of to the system. The system examines the image of the object and leverages system data (location policies 146, disposal corpus 142, material corpus 144) to determine appropriate recommendations for disposal. The ICDS provides the citizen with information as to whether the items are properly prepared for disposal "as-is" or if additional preparation actions by the citizen are required, such as disassembly or cleaning.

Figure 4:
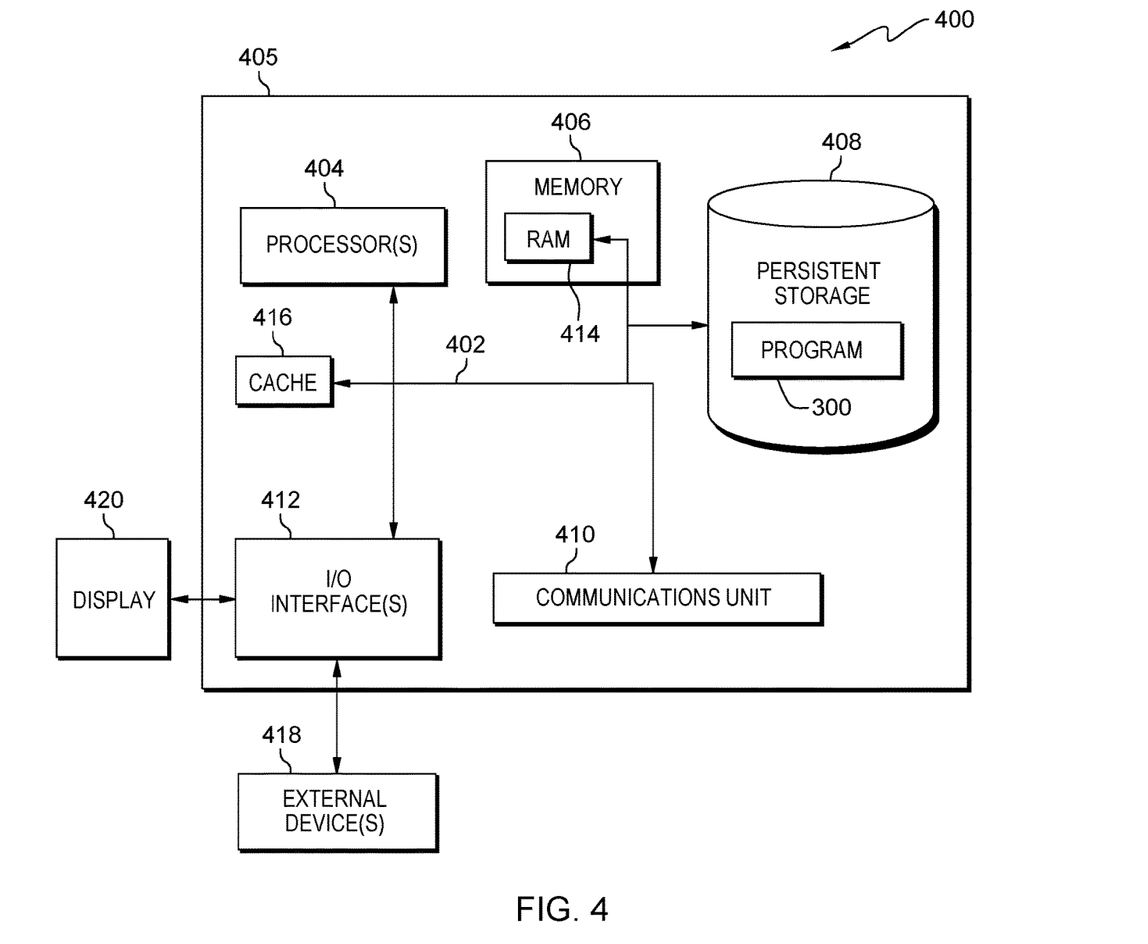
FIG. 4 depicts a block diagram of components of a computing system, including a computing device capable of operationally performing the disposal application of FIG. 3, in accordance with an embodiment of the present invention.

FIG. 4 depicts a block diagram of components of computing system 400, which includes computing device 405. Computing device 405 includes components and functional capability similar to mobile device 110 and disposal operations server 130 (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media. In this embodiment, memory 406 includes random access memory (RAM) 414. In general, memory 406 can include any suitable volatile or non-volatile computer readable storage media.

In one embodiment, disposal application 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Disposal application 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., disposal application 300 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method and system for generating a recommendation for disposal of an object, the method comprising:
   determining, by one or more processors, a classification of an object included in an image;
   determining, by the one or more processors, whether a current state and the classification of the object corresponds to a recommendation for a disposal, based on disposal policies of a community location associated with the disposal of the object;
   responsive to determining the disposal of the object in the current state is not recommended, based on the disposal policies of the community location, identifying, by the one or more processors, one or more components of the object;
   determining, by the one or more processors, whether a recommendation for disposal of the one or more components of the object is available, based on the classification of the object and a material type of the one or more components;
   responsive to determining a recommendation for disposal of the one or more components of the object, generating, by the one or more processors, a notification including instructions for disassembly of the object into the one or more components, preparation of the one or more components of the object for disposal action, and information regarding a scheduling and collection point for disposal of the object;
   presenting, by the one or more processors, the notification for completing the disposal action and the information regarding the scheduling and collection point for disposal of the object;
   receiving, by the one or more processors, a request for receipt of an alert, the alert triggered at a pre-determined proximity of distance of a vehicle performing the scheduled disposal pick-up service; and
   transmitting, by the one or more processors, the alert as the scheduled disposal pick-up service enters the pre-determined proximity of distance.

2. The method of claim 1 wherein the disposal recommendation includes designating a container bin in which the one or more components of the object are placed for disposal service.

3. The method of claim 1, further comprising:
   requesting, by the one or more processors, confirmation of completion of the disposal actions associated with the recommendation for disposal of the one or more components of the object from a user;
   in response to receiving the confirmation from the user subsequent to the completion of the disposal actions associated with the recommendation for disposal of the one or more components of the object, storing, by the one or more processors, information associated with the confirmation of completion of the disposal actions in a metrics repository; and
   providing, by the one or more processors, a feedback message to the user including metrics indicating a level of performance of disposal associated with the user.

4. The method of claim 1, wherein the recommendation of disposal for the one or more components of the object includes a designation of a disposal bin to place the component and a request for confirmation of placement of the one or more components into the disposal bin.

5. The method of claim 1, wherein determining the classification of the object and identification of the one or more components of the object further comprises:
   performing, by the one or more processors, object recognition analysis on the image of the object;
   retrieving, by the one or more processors, metadata that is associated with the image of the object; and
   comparison, by the one or more processors, of the image and the metadata associated with the object to a corpus of images and metadata of objects for disposal.

6. The method of claim 1, wherein the type of material of the one or more components of the object is determined based on a model trained by supervised and unsupervised techniques and applying a corpus of images of objects for disposal and associated metadata including respectively, the type of material.

7. The method of claim 1, further comprising:
   receiving, by the one or more processors, a request for receipt of a notification as a reminder of a scheduled disposal service, the notification triggered at a pre-determined temporal proximity of the scheduled disposal service; and
   responsive to an occurrence of the pre-determined temporal proximity, transmitting, by the one or more processors, the notification as a reminder of the scheduled disposal service.

8. A computer program product for generating a recommendation for disposal of an object the computer program product comprising:
   one or more computer readable storage media and program instructions stored on the one or more computer readable storage media, the program instructions comprising:
   program instructions to determine a classification of an object included in an image;
   program instructions to determine whether a current state and the classification of the object corresponds to a recommendation for a disposal, based on disposal policies of a community location associated with the disposal of the object
   responsive to determining the disposal of the object in the current state is not recommended, based on the disposal policies of the community location, program instructions to identify one or more components of the object;
   program instructions to determine whether a recommendation for disposal of the one or more components of the object is available, based on the classification of the object and a material type of the one or more components;

responsive to determining a recommendation for disposal of the one or more components of the object, program instructions to generate a notification including instructions for disassembly of the object into the one or more components, preparation of the one or more components of the object for disposal action, and information regarding a scheduling and collection point for disposal of the object;

program instructions to present the notification for completing the disposal action and the information regarding the scheduling and collection point for disposal of the object;

receiving, by the one or more processors, a request for receipt of an alert, the alert triggered at a pre-determined proximity of distance of a vehicle performing the scheduled disposal pick-up service; and transmitting, by the one or more processors, the alert as the scheduled disposal pick-up service enters the pre-determined proximity of distance.

9. The computer program product of claim 8, wherein the disposal recommendation includes program instructions designating a container bin in which the one or more components of the object are placed for disposal service.

10. The computer program product of claim 8, further comprising:

program instructions to request confirmation of completion of the disposal actions associated with the recommendation for disposal of the one or more components of the object from a user;

in response to receiving the confirmation from the user subsequent to the completion of the disposal actions associated with the recommendation for disposal of the one or more components of the object, program instructions to store information associated with the confirmation of completion of the disposal actions in a metrics repository; and program instructions to provide a feedback message to the user including metrics indicating a level of performance of disposal associated with the user.

11. The computer program product of claim 8, wherein program instructions to determine the classification of the object and identification of the one or more components of the object further comprises:

program instructions to perform object recognition analysis on the image of the object;

program instructions to retrieve the metadata that is associated with the image of the object; and program instructions to compare the image and the metadata associated with the object to a corpus of images and metadata of objects for disposal.

12. The computer program product of claim 8, wherein the type of material of the one or more components of the object is determined based on program instructions to train a model by supervised and unsupervised techniques and applying a corpus of images of objects for disposal and associated metadata including respectively, the type of material.

13. The computer program product of claim 8, further comprising:

program instructions to receive a request for receipt of a notification as a reminder of a scheduled disposal service, the notification triggered at a pre-determined temporal proximity of the scheduled disposal service; and responsive to an occurrence of the pre-determined temporal proximity, program instructions to transmit the notification as a reminder of the scheduled disposal service.

14. A computer system for generating a recommendation for disposal of an object, the computer system comprising:

one or more computer processors;

one or more computer readable storage media; and program instructions stored on the one or more computer readable storage media, the program instructions comprising:

program instructions to determine a classification of an object included in an image;

program instructions to determine whether a current state and the classification of the object corresponds to a recommendation for a disposal, based on disposal policies of a community location associated with the disposal of the object;

responsive to determining the disposal of the object in the current state is not recommended, based on the disposal policies of the community location, program instructions to identify one or more components of the object;

program instructions to determine whether a recommendation for disposal of the one or more components of the object is available, based on the classification of the object and a material type of the one or more components;

responsive to determining a recommendation for disposal of the one or more components of the object, program instructions to generate a notification including instructions for disassembly of the object into the one or more components, preparation of the one or more components of the object for disposal action, and information regarding a scheduling and collection point for disposal of the object;

program instructions to present the notification for completing the disposal action and the information regarding the scheduling and collection point for disposal of the object;

receiving, by the one or more processors, a request for receipt of an alert, the alert triggered at a pre-determined proximity of distance of a vehicle performing the scheduled disposal pick-up service; and transmitting, by the one or more processors, the alert as the scheduled disposal pick-up service enters the pre-determined proximity of distance.

15. The computer system of claim 14, further comprising:

program instructions to request confirmation of completion of the disposal actions associated with the recommendation for disposal of the one or more components of the object from a user;

in response to receiving the confirmation from the user subsequent to the completion of the disposal actions associated with the recommendation for disposal of the one or more components of the object, program instructions to store information associated with the confirmation of completion of the disposal actions in a metrics repository; and program instructions to provide a feedback message to the user including metrics indicating a level of performance of disposal associated with the user.

16. The computer system of claim 14, wherein program instructions to determine the classification of the object and identification of the one or more components of the object further comprises:

program instructions to perform object recognition analysis on the image of the object;

program instructions to retrieve metadata that is associated with the image of the object; and program instructions to compare the image and the metadata associated with the object to a corpus of images and metadata of objects for disposal.

17. The computer system of claim 14, further comprising:

program instructions to receive a request for receipt of a notification as a reminder of a scheduled disposal service, the notification triggered at a pre-determined temporal proximity of the scheduled disposal service; and responsive to an occurrence of the pre-determined temporal proximity, program instructions to transmit the notification as a reminder of the scheduled disposal service.

\* \* \* \* \*